United States Patent
Haviv et al.

(10) Patent No.: US 7,216,225 B2
(45) Date of Patent: May 8, 2007

(54) FILTERED APPLICATION-TO-APPLICATION COMMUNICATION

(75) Inventors: Yaron Haviv, Zoran (IL); Guy Corem, Moshav Be'er Tuvia (IL)

(73) Assignee: Voltaire Ltd., Hertzlia (IL)

( * ) Notice: Subject to any disclaimer, the term of this patent is extended or adjusted under 35 U.S.C. 154(b) by 922 days.

(21) Appl. No.: 09/863,423

(22) Filed: May 24, 2001

(65) Prior Publication Data

US 2002/0059517 A1 May 16, 2002

Related U.S. Application Data

(60) Provisional application No. 60/206,776, filed on May 24, 2000.

(51) Int. Cl.
*H04L 9/32* (2006.01)
(52) U.S. Cl. .......................... 713/152; 709/225; 726/1
(58) Field of Classification Search ............... 713/200, 713/201, 166, 168, 151–154, 100; 709/200, 709/203, 223, 225, 229; 380/225, 247, 270; 726/1–4, 9, 13, 17, 21; 719/319–329
See application file for complete search history.

(56) References Cited

U.S. PATENT DOCUMENTS

| | | | |
|---|---|---|---|
| 5,896,499 A | | 4/1999 | McKelvey |
| 5,987,611 A * | | 11/1999 | Freund ............... 726/4 |
| 6,067,569 A | | 5/2000 | Khaki et al. |
| 6,178,505 B1 | | 1/2001 | Schneider et al. |
| 6,182,226 B1 | | 1/2001 | Reid et al. |
| 6,247,128 B1 * | | 6/2001 | Fisher et al. .......... 713/100 |
| 6,398,105 B2 * | | 6/2002 | Ramberg et al. ........ 235/375 |
| 6,412,035 B1 * | | 6/2002 | Webber ............... 710/261 |
| 6,445,682 B1 * | | 9/2002 | Weitz ................ 370/257 |
| 6,487,600 B1 * | 11/2002 | Lynch ................. 709/229 |
| 6,502,135 B1 * | 12/2002 | Munger et al. ........ 709/225 |
| 6,526,523 B1 * | 2/2003 | Chen et al. ............. 714/38 |
| 6,574,669 B1 * | 6/2003 | Weaver ............... 709/239 |
| 6,675,218 B1 * | 1/2004 | Mahler et al. ......... 709/230 |
| 6,678,827 B1 * | 1/2004 | Rothermel et al. ...... 713/201 |
| 6,690,757 B1 * | 2/2004 | Bunton et al. ......... 375/371 |
| 6,691,165 B1 * | 2/2004 | Bruck et al. .......... 709/227 |
| 6,694,379 B1 * | 2/2004 | Hanko et al. ......... 719/329 |
| 6,747,997 B1 * | 6/2004 | Susnow et al. ........ 370/509 |
| 6,751,235 B1 * | 6/2004 | Susnow et al. ........ 370/503 |
| 6,757,289 B1 * | 6/2004 | Cain et al. ............ 370/401 |

(Continued)

FOREIGN PATENT DOCUMENTS

EP     0 465 016     1/1992

(Continued)

OTHER PUBLICATIONS

Search Report from EP 01 93 6768.

*Primary Examiner*—Kim Vu
*Assistant Examiner*—Leynna T. Ha
(74) *Attorney, Agent, or Firm*—Eitan Law Group

(57) ABSTRACT

Some embodiments of the present invention are directed to a system that enables filtered application-to-application communication in a server farm in a multi-channel reliable hardware environment (e.g. InfiniBand). The system may also improve the performance of application-to-application communication between servers in the farm. The implementation of multi-channel reliable communication hardware may reduce the number of communication software layers above.

20 Claims, 5 Drawing Sheets

U.S. PATENT DOCUMENTS 6,799,202 B1 * 9/2004 Hankinson et al. .......... 709/219
6,807,580 B2 * 10/2004 Freeman et al. ............. 709/249
6,915,457 B1 * 7/2005 Miller ......................... 714/43
6,928,469 B1 * 8/2005 Duursma et al. ........... 709/223

FOREIGN PATENT DOCUMENTS

WO     WO 99/45454     9/1999

* cited by examiner

FILTERED APPLICATION-TO-APPLICATION COMMUNICATION

CROSS-REFERENCE TO RELATED APPLICATIONS

The present application claims priority from U.S. provisional application Ser. No. 60/206,776, filed May 24, 2000, which is incorporated herein by reference in its entirety.

BACKGROUND OF THE INVENTION

High computing capacity is achieved by connecting a few servers with the same or different functionality together to form a server farm. Applications running on these servers need to transfer data to one another. A server farm environment is generally built from servers having different levels of security. In such an environment, the secure servers must protect themselves from attacks originating at the servers having less security.

One of the methods to protect sensitive servers from attacks from less trusted servers is the use of application level firewalls. Application level firewalls generally are hosts running proxy servers, which do not permit direct traffic between segments of the networks, and which perform elaborate logging and auditing of data traffic passing through them. The proxy applications are software components running on the firewall and emulating the real target application. Having a proxy application in the way negatively impacts the performance of the server farm as a whole. It also makes the firewall less transparent, causing compatibility problems.

Since firewalls are a separate unit between segments of the network, and since they contain complex logic, they generate a substantial delay in the application-to-application communications. The more complex and high-level the filtering, the greater the delay. Furthermore, firewalls may cause a communication bottleneck and may add a point of failure between the applications. Moreover, a server farm may have a complex topology with redundant links and parallel configurations. In order to maintain the level of security for such a topology, a new firewall may be added for each new segment that may be created.

Moreover, high-level filtering is almost impossible if the protocol is complex or undocumented, because the network layers under the layer to be inspected need to be emulated. Therefore, application-level filtering is currently performed only on well-documented protocols in environments that are less performance-sensitive. Examples of such well-documented protocols include e-mail protocols, file transfer protocol (FTP) and hypertext transfer protocol (HTTP). Examples of protocols on which high-level filtering is not performed include database transactions, network file system (NFS) transactions and remote procedure call (RPC) transactions.

Currently application-to-application communication over a network involves several layers of protocol, for example the seven layers of the open systems interconnection (OSI) model. Among their many functions, these layers may enable error handling, rearranging packets that arrive in the wrong order, and multiplexing of data from different applications.

In the near future, application-to-application communication may take place over an efficient network having multi-channel communication hardware with communication protocols mostly implemented in hardware. Non-limiting examples of such network include new system area network (SAN), InfiniBand network, Fiber-Channel network and asynchronous transfer mode (ATM) network. Within these networks, it may be almost impossible and generally impractical to provide firewalls able to support the bandwidth and topology of these architectures. It would be advantageous to provide a new efficient method to filter application-to-application traffic.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1B:
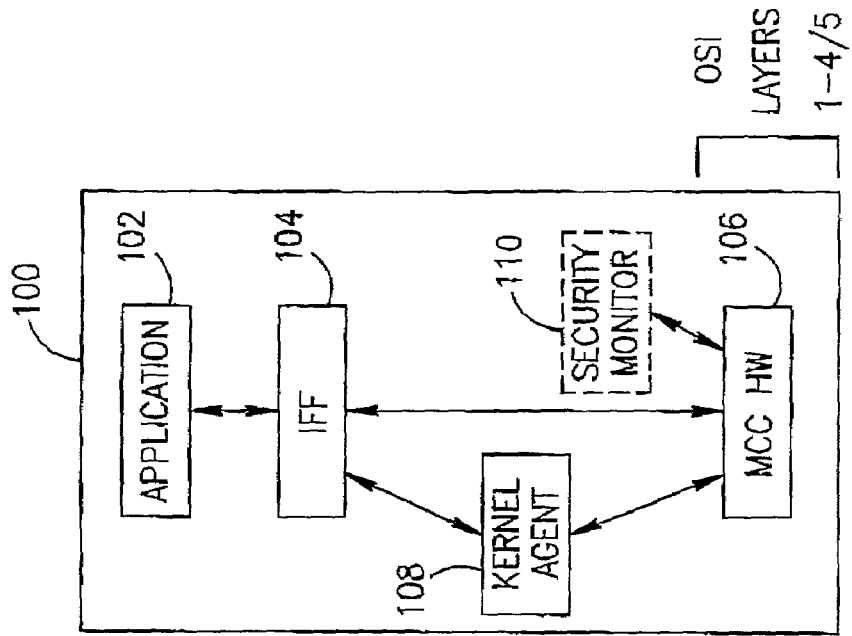
FIGS. 1A and 1B illustrate a comparison of a standard network in relation to the OSI model and an exemplary system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some embodiments of the present invention are directed to a system that enables filtered application-to-application communication in a server farm in a multi-channel reliable hardware environment (e.g. InfiniBand). The system may also improve the performance of application-to-application communication between servers in the farm. The implementation of multi-channel reliable communication hardware may reduce the number of communication software layers above.

In some embodiments of the present invention a lightweight protocol based partly in hardware may replace the existing application/transport network layer (layers 4–7) of the OSI model. The protocol may enable direct application (user space)-to-hardware communication and may enable the implementation of transport protocols in hardware.

Figure 1A:
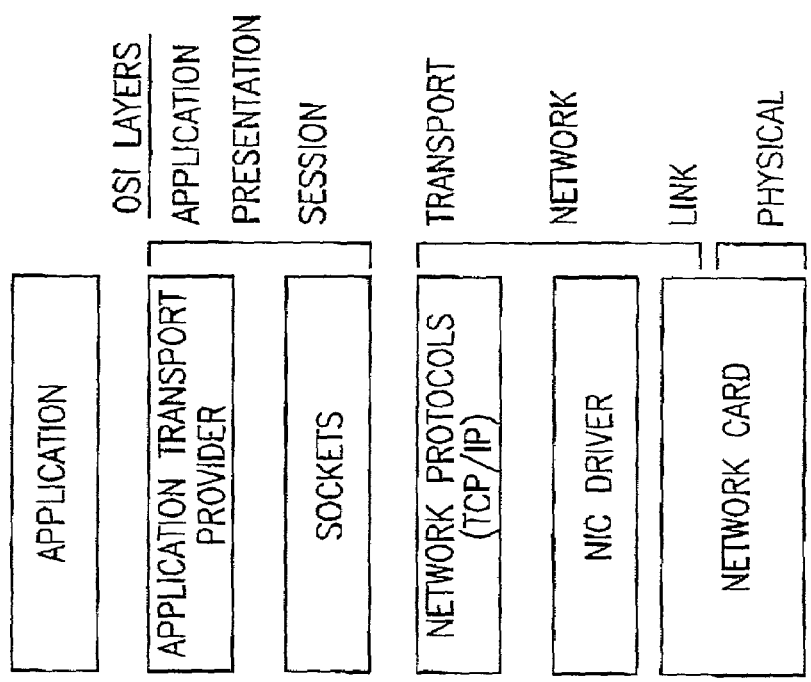

Reference is now made to FIGS. 1A and 1B, which illustrates a comparison of an exemplary standard-network server and an exemplary multi-channel communication hardware server according to some embodiments of the present invention. FIG. 1A illustrates a block diagram of a standard-network server in relation to the OSI model. In a standard network, a network interface card (NIC) and a NIC driver are mainly associated with the physical layer and the link layers of the OSI model.

The network protocols (e.g. TCP/IP) are mainly associated with the network and transport layers. The upper four layer of the OSI model may be associated with sockets (e.g. winsock) and application transport provider (e.g. netlib). In a communication between users, there is a flow of data through each layer at one end down through the layers in that server and, at the other end, when the data arrives, another flow of data up through the layers in the receiving server and ultimately to the end user. In contrast, in some embodiments of the present invention, a multi-channel reliable communication hardware may communicate directly with an application associated with the application layer of the OSI model as will be explained below.

FIG. 1B illustrates a block diagram of a multi-channel communication hardware server (MMC HW) in a fast network, which enables a fast filtered application-to-application communication between servers according to some embodiments of the present invention. In these embodiments, multi-channel reliable communication hardware 106 may replace the standard network card. In relation to the OSI model, communication hardware 106 may replace the first four OSI layers and some functions of the upper OSI layers as well.

A server 100 may comprise a plurality of applications 102, a plurality of application program interfaces (API) and filters (IFF) 104 and multi-channel communication hardware 106. Server 100 may also comprise a kernel agent 108 and optionally may comprise a security monitor 110. The term "kernel agent" refers to software elements in a kernel system, which initialize the hardware elements of the kernel system. These software elements may be further adapted to allocate channels, to handle errors and the like.

Communication hardware 106 may provide special communication capabilities of transferring data reliably directly from process to process. Non-limiting examples of such communication capabilities include error detection, queuing, memory management, multiplexing and security. Therefore, there may be a significant increase in application-to-application communication performance, because these capabilities no longer need to be provided in the software part of the application-to-application communication. It should be noted that communication hardware 106 may comprise a transport communication layer implemented in hardware and may have kernel-bypassing capabilities.

Non-limiting examples of communication hardware 106 include new system area network (SAN) technology, for example virtual interfaces (VI), InfiniBand, Fiber-Channel, small computer system interface (SCSI), asynchronous transfer mode (ATM) and even modified Ethernet.

IFF 104 may be adapted to execute functions that are executed in a standard network by the application layer, the presentation layer, the session layer and the transport layer as will be described in more details with respect to FIG. 2.

Figure 2:
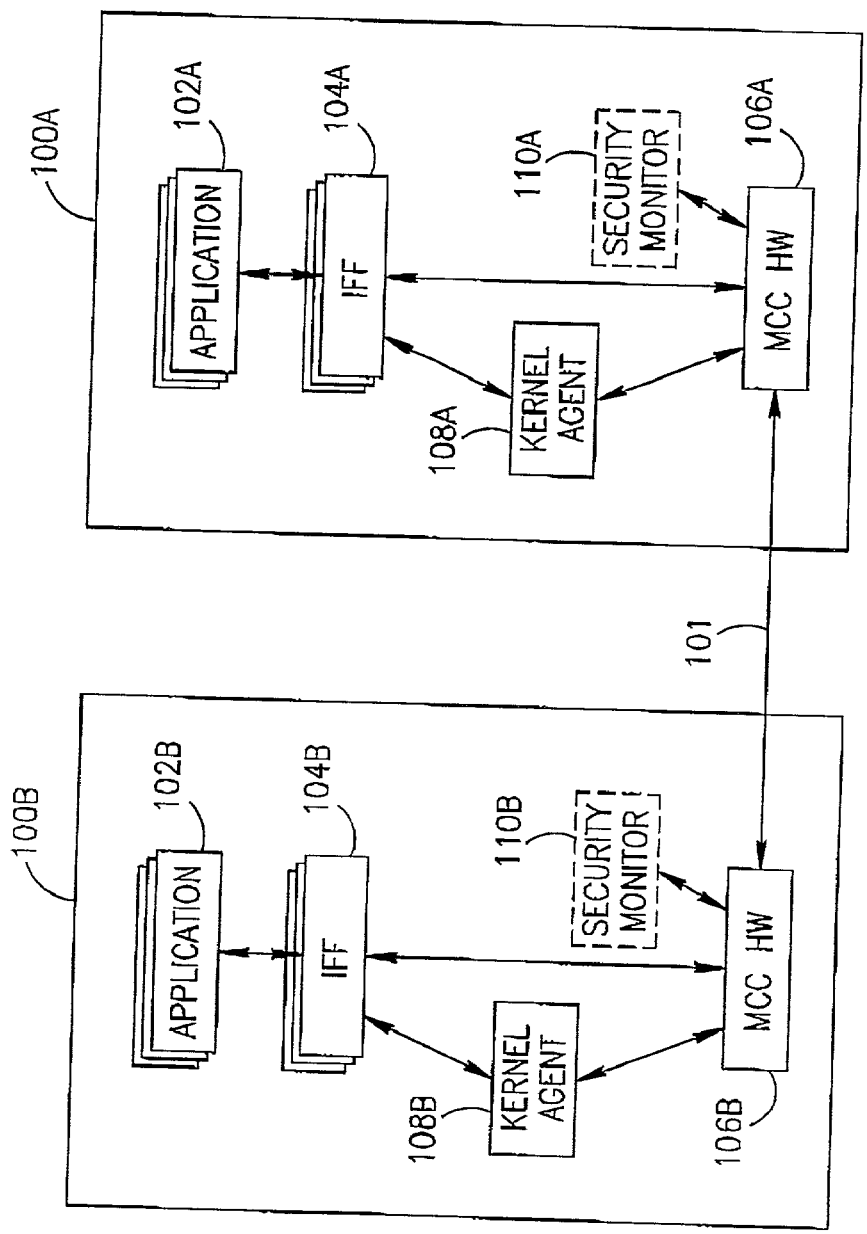
FIG. 2 is a schematic illustration of a filtering system for network devices according to some embodiments of the present invention.

Reference is now made to FIG. 2, which is a schematic illustration of a filtering system for network devices according to some embodiments of the present invention. A server farm may include servers 100A and 100B, where, for example, server 100A is more trusted than server 100B. Server 100A may comprise a plurality of applications 102A, a plurality APIs and filters (IFF) 104A and multi-channel communication hardware 106A. Server 100A may also comprise a kernel agent 108A and optionally may comprise a security monitor 110A.

Similarly, server 100B may comprise a plurality of applications 102B, a plurality of application IFFs 104B and multi-channel communication hardware 106B. Server 100B may further comprise a kernel agent 108B and may optionally comprise a security monitor 110B. Servers 100A and 100B may be connected therebetween via a multi-channel communication link 101 between multi-channel communication hardware 106A and 106B.

Each application IFF 104 may provide an interface to a particular type of application 102. For example, there may be separate application IFFs 104 for sockets (e.g. winsock), network driver interface specification (NDIS), remote procedure call (RPC), network file system (NFS), distributed component object model (DCOM) and database applications. Application IFFs 104 may be implemented in software to provide an interface between applications 102 and multi-channel communication hardware 106. For example, a database application 102 may call object linking and embedding database (OLEDB) functions. One of the applications IFF 104 may provide OLEDB functions to the database application 102 and may implement a new protocol that may directly access communication hardware 106.

Each IFF 104 may include a filter that may filter communication based on a predetermined policy. Since the filter is at the application layer, the filter may inspect transactions between applications and reject them or issue an alert if they do not comply with high-level, application-specific rules including an illegal or impermissible client identity. Non-limiting examples of transactions on which can be performed a high-level filtering include:

a) filtering database SQL transactions, login, stored procedures;

b) filtering invocation of RPC transactions, objects and methods;

c) filtering sockets (Winsock, BSD, etc) operations;

d) filtering remote logins;

e) filtering remote file system access commands (i.e. file sharing, NFS, CIFS), based on the path and/or the access type (read, write, create, delete, etc.); and f) filtering remote management commands (for example, a Web server cannot tell an application server to kill a process, and a Web server cannot tell an application server to shut down).

An example of an API and a filter (IFF) 104 may be a socket application filter (socket IFF), which is configured according to some embodiments of the present invention. An example of a socket IFF may be a Winsock IFF. The Winsock IFF is responsible for filtering Winsock-based applications. The filtering process may be performed by intercepting the Winsock API calls.

Non-limiting examples of data available to a socket IFF include the name of the process, which calls the socket, the requested peer address for connection, port numbers, the actual data that is received or transmitted, and the total number of open connections. Based on these inputs, the IFF may decide whether to silently fail the operation, to alert the system administrator of suspicious activity, to pass the request forward or to authenticate the request.

The filter (IFF) may operate in several ways. One way of operation may be blocking local processes by comparing a process to a list of allowed calling processes. The socket library (e.g. Winsock DLL) is mapped to the calling process address space. Therefore, the filter may request the calling process file information and may compare the received value to a set of rules to determine whether the calling process is allowed to call the socket application.

Another way of operation may be by blocking client ports. The filter may check the parameters of the "connect" API to receive the destination address and port. The server address and port number may be tested against a set of predetermined rules. If the test fails, the connection is rejected.

Alternatively, the filter may block server ports. The filter may check the "listen" API, i.e. the socket that is used for listening to new connections. If the listening port is not valid according to a predefined filtering policy, the function fails. Another more specific filter may be applied to the "accept" API. Upon accepting a connection, the filter may check the client address. If the address is valid according to a predefined filtering policy, the connection is accepted.

Another way for the operation of Winsock IFF may be blocking specific data. The filter may examine the buffers sent over a connection (send and receive API). The data may be examined according to a predefined filtering policy. The socket IFF may manage a set of tables. Non-limiting examples of the tables may include a privileged processes table having the process name and path and checksum and a listening port table including port number and maximum allowed connection for server port. Other examples may include an approved client address table including client address and maximum allowed connections from the client, and a data filter table.

Another example of an API and a filter (IFF) may be a database filter configured according to some embodiments of the present invention.

The database IFF may regulate communication protocol by intercepting the calls to the database and replacing them with a secure protocol layer. More specifically, the filter may be implemented as an OLE-DB provider. Non-limiting examples of data available to database IFF include the database user, the transaction type, passwords, and the location of the client machine, the records and table data. Based on these inputs, the filter layer may decide whether to fail the operation.

The database IFF may locate specific users by checking the connection packet, may identify specific client machines by checking physical connection requests, may filter specific transactions by examining the transaction properties or any combination thereon.

The table below specifies what type of data the client may send and the type of data available for the FFI.

| Client Sends | Data available to filter |
| --- | --- |
| Database connection request | Client physical address, user login, user password. |
| Database transaction | Client physical address, the SQL query |
| DCOM method invocation | Client physical address, GUID, method |
| File System request | Client physical address, folder, file attributes, user ID, password. |
| Winsock connect request | Client physical address, port numbers, app |

Applications 102 are identified/authenticated to IFFs 104 before creating a connection, thus avoiding the problem of Trojans, scanning tools and the exploitation of the server application through protocol holes. This may be done by identifying and/or authenticating any of the following:

a) the module name and/or the names of the executable(s);

b) the location of the executable(s);

c) the timestamp of the executable(s);

d) the size of the executable(s); and e) a hash (e.g. CRC, MD5, SHA) of the executable(s), f) a token and/or a key provided to the application and/or to the application process by an authentication service and/or a subnet manager and/or a domain controller.

It is noted that hereandbelow in the specification as well as in the claims, the term token includes any type of security token, a security key, a seed or any equivalence.

The high-level filtering explained above might be used in order to ensure that allowed applications are not used in a way that compromises security (e.g. by issuing illegal transactions). In order to avoid spoofing, the filtering may verify that the logical user name or resource name or resource address originating from a particular resource corresponds to the physical address of that resource and/or to other unique value associated with the resource, such as a key, a token or a global unique identifier (GUID).

The communication between application IFF 104 and communication hardware 106 may also need to be secured. One possibility is to force a handshake between application IFF 104 and communication hardware 106 before opening a connection. In this case, communication hardware 106 must contain an authentication mechanism.

Another possibility may be to force a handshake between IFF 104A and IFF 104B when IFF 104A wants to send data to IFF 104B. In this case, standard communication hardware 106 as described above may be used. Yet another possibility may be that the operating system (OS) ensures that the IFF's 104 and/or other related software has not changed.

Kernel software is generally considered secure. However, when it is necessary to ensure that the kernel is secure, it may be advantageous to use the following process: When server 100 boots up, kernel agent 108 may authenticate itself with communication hardware 106 in a challenge-response process. It may also authenticate itself with an authentication service, which may be in another machine. Then, anytime a user process on server 100 wants to communication with an application on another server, it has to authenticate itself with the kernel agent 108. Once the authentication is complete, kernel agent 108 may contact communication hardware 106, which issues a channel to agent 108 that is passed on to application IFF 104. Application IFF 104 then uses the channel to continue the secure communication.

Security monitor 110 may alert other systems that a security breach has occurred and that a server is no longer trusted. Security monitor 110 may send a heartbeat to multi-channel communication hardware 106 or to a central management service to indicate that all is well. Security monitor 110 may be implemented as a part of the operating system.

Figure 3:
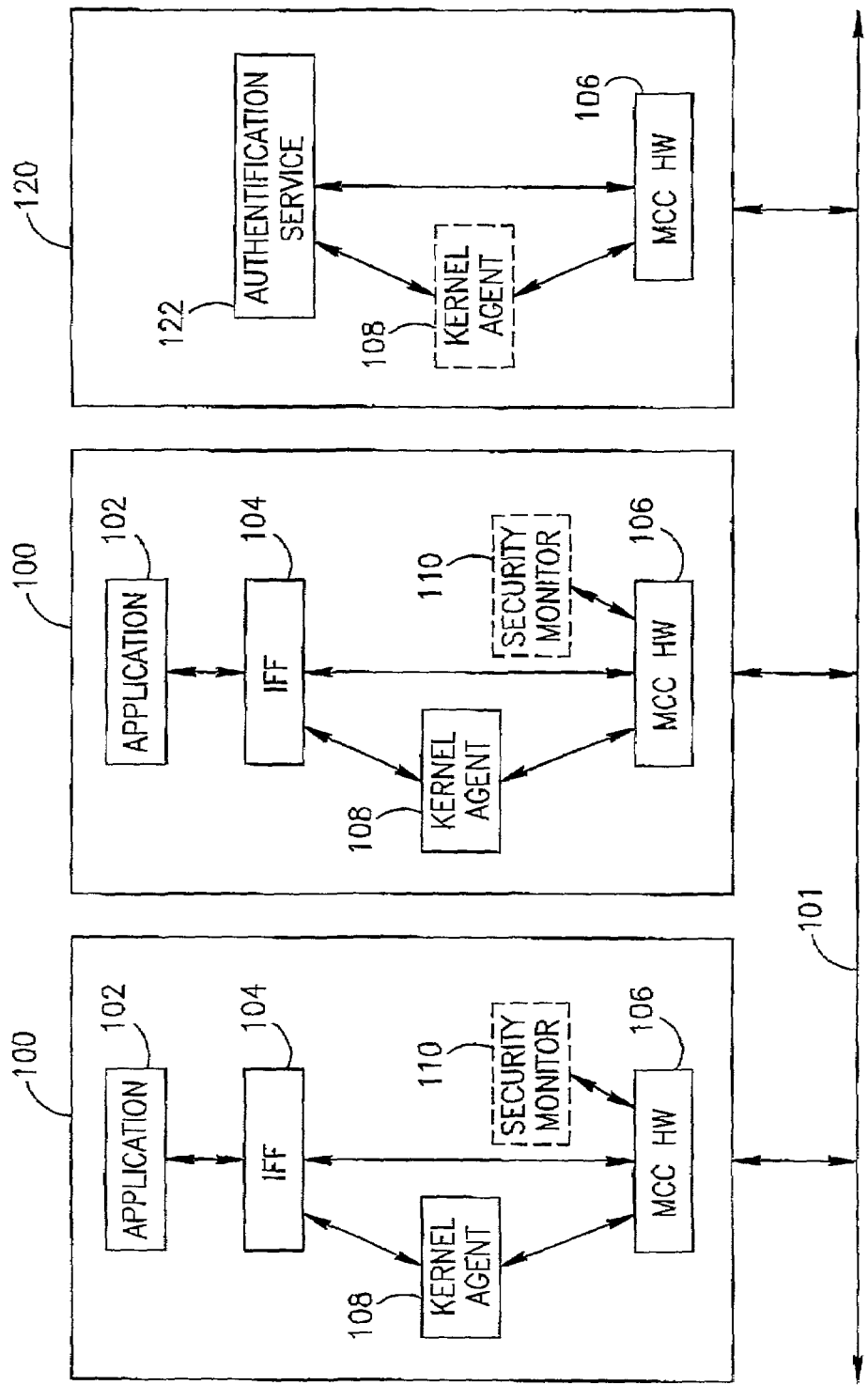
FIG. 3 is a schematic illustration of a filtering system for network devices having a filtering server according to some embodiments of the present invention.

Reference is now made to FIG. 3, which is a schematic illustration of a filtering system for network devices having a filtering server according to some embodiments of the present invention. A server farm may comprise a plurality of servers 100 and an authentication server 120. Authentication server 120 may comprise a multi-channel hardware communication 106, optionally a kernel agent 108 and an authentication service 122 coupled to multi-channel hardware communication 106 and to kernel agent 108. Non-limiting examples of such authentication service include a subnet manager, a domain controller and a certificate authority (CA). In these embodiments, the authentication process described hereinabove may be performed on authentication server 120. Instead of performing the security policies on each of server 100, the system may take advantage of the high performance of communication link 101 to perform a centralized authentication.

An application layer filter at IFF 104 may inspect transactions between applications 102 and may request an authentication from authentication server 120. As described in relation to FIG. 2, application 102 may be identified and/or authenticated to application IFF before creating the connection. In another embodiments of the present invention, the servers may have dedicated multi-channel communication hardware for authorization purposes. However, the servers may transfer other data via a standard communication link.

Figure 4A:
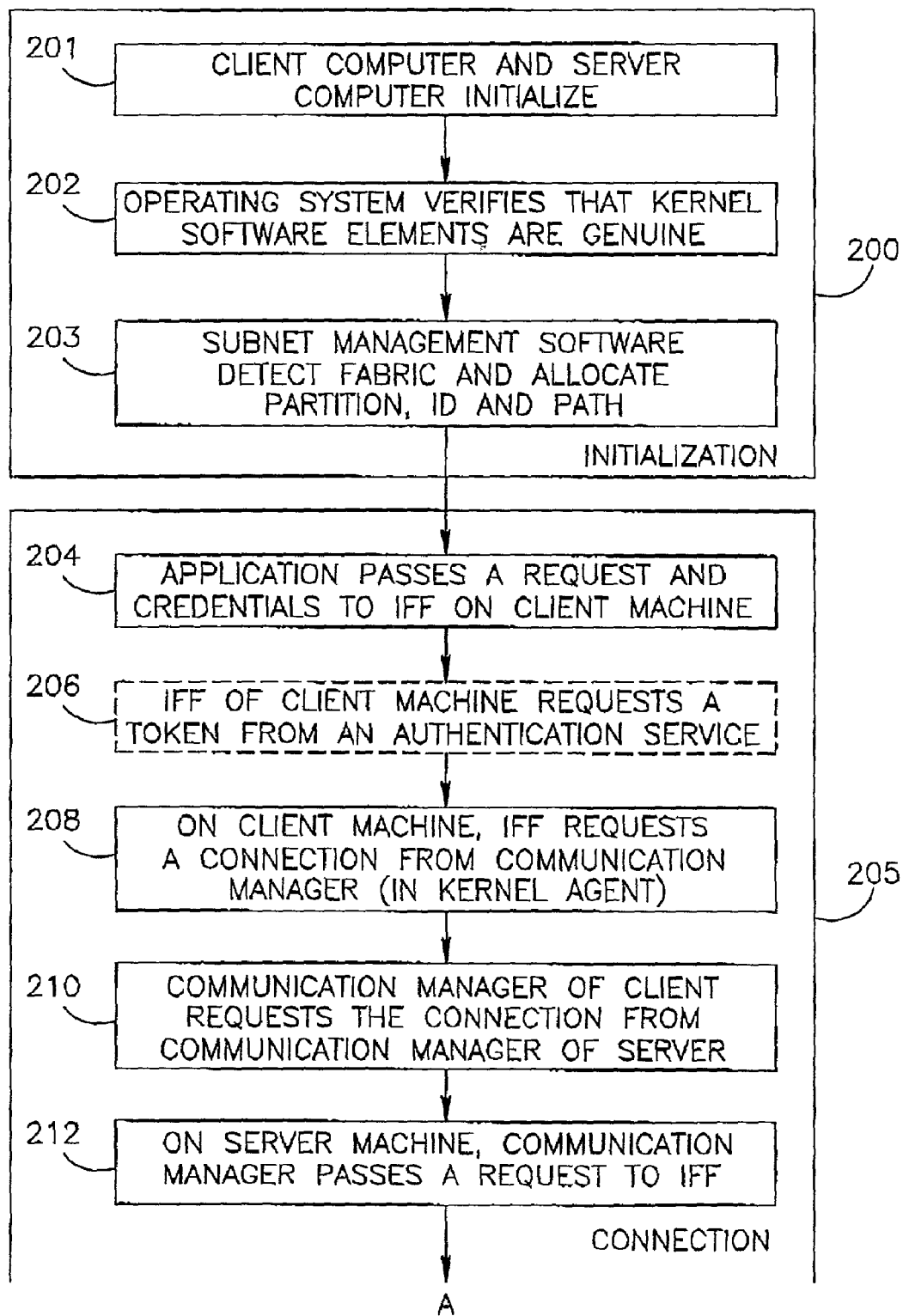
FIGS. 4A and 4B show a flowchart diagram of the process of connection and transaction in an InfiniBand network according to some embodiments of the present invention.
Figure 4B:
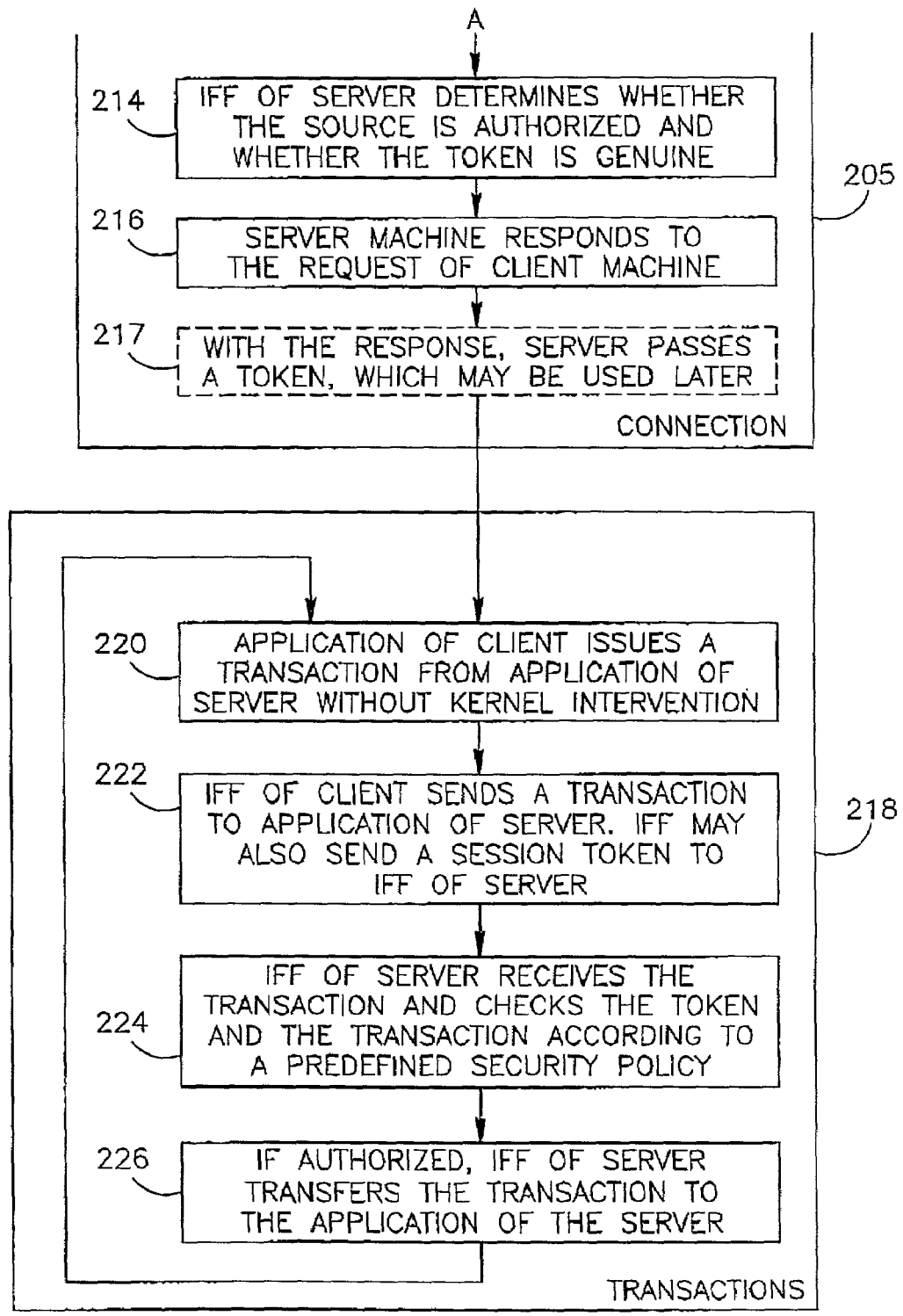

Reference is now made to FIGS. 4A and 4B, which is a flow chart diagram of the process of connection and transaction in InfiniBand network according to some embodiments of the present invention. In this example, server 100A is referred as a client computer and server 100B is referred as a server computer. The first stage, which is illustrated in block 200, is the initialization of computers 100A and 100B. When client 100A and server 100B boots up (step 201), the operating system of the computers may verify that the kernel software elements, i.e. kernel agents 108 are genuine (step 202). In addition, Infiniband subnet management software may detect the fabric and may allocate partitions, local ID's and paths (step 203).

The second stage, which is illustrated in block 205, is the connection establishment. A client application on client computer 100A may want to establish a connection with server application on server computer 100B. Application 102A may pass a request together with credentials to IFF 104A (step 204). IFF 104A may request a token from an authentication service (step 206). Alternatively, IFF 104A may request a token, a key or a seed from the operating system of client computer 100. This operation may also be performed at a later stage on a per transaction basis as explained hereinbelow.

Now, IFF 104A may request a connection to application 102B from communication manager embedded in the system kernel (step 208). IFF 104A may pass the token as a parameter to the system kernel.

The communication manager of client computer 100A may request the connection from the communication manager of server computer 100B (step 210). On the server machine, communication manager of computer 100B may pass the request together with the token to IFF 104B (step 212).

IFF 104B may determine whether the passed token is genuine and whether the source is authorized (step 214). IFF 104B may optionally send a random number back to IFF 104A to form a challenge-response authentication. When the authentication is ended IFF 104B and communication manager of server computer 100B may respond to the request of client 100A in any known method (step 216). Optionally, together with data transfer, a session token may be provided by server 100B to client 100A (step 217). The session token may be used in the following transactions.

As was mentioned hereinabove, the authentication and identification may be performed in a separate transaction after the connection has already been established in a standard way.

Now the connection between application 102A and application 102B may be established. All transactions and data transfer therefrom may flow directly between application 102A and application 102B without the need for kernel intervention. The transaction process is described hereinbelow with respect to block 218.

Application 102A may issue a transaction from application 102B without kernel intervention (step 220). IFF 104A may send the transaction to application 102B. If a session token is available, IFF 104A may sent the session token to IFF 104B (step 222). IFF 104B may receive the transaction and may check the token and the transaction according to a predefined security policy (step 224). If the transaction is legal, IFF 104B may transfer the transaction to application 102B for execution (step 226).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for filtered application-to-application communication of applications running on computing platforms including an operating system kernel, said method comprising:

providing a communication interface to an application, wherein the communication interface bypasses a portion of the operating system kernel associated with communication resources;

filtering application data received from a process of said application according to a predetermined policy; and providing said filtered application data directly to communication hardware by bypassing a portion of the operating system kernel associated with communication resources.

2. The method of claim 1 further comprising:
verifying the identity of said application prior to providing said filtered application data.

3. The method of claim 2 further comprising:
sending at least one security token.

4. The method of claim 1 further comprising:
verifying the identity of a machine participating in said process prior to providing said filtered application data.

5. The method of claim 4 further comprising:
sending at least one security token.

6. The method of claim 1, wherein providing said filtered application data comprises providing said filtered application data directly to a multi-channel network interface card having direct user-to-hardware access.

7. The method of claim 6, wherein said multi-channel network interface card is an InfiniBand card.

8. A method for filtered application-to-application communication of applications running on computing platforms including an operating system kernel, said method comprising:

providing a communication interface to an application, wherein the communication interface bypasses a portion of the operating system kernel associated with communication resources;

filtering application data received from a process of said application sending an authentication request to an authentication service;

receiving authentication information; and providing said filtered application data directly to communication hardware by bypassing a portion of the operating system kernel associated with communication resources.

9. The method of claim 8 further comprising:
verifying the identity of said application prior to providing said filtered application data.

10. The method of claim 9 further comprising:
sending at least one security token.

11. The method of claim 8 further comprising:
verifying the identity of a machine participating in said process prior to providing said filtered application data.

12. The meted of claim 11 further comprising:
sending at least one security token.

13. The method of claim 8, wherein providing said filtered application data comprises providing said filtered application data directly to a multi-channel network interface card having direct user-to-hardware access.

14. The method of claim 13, wherein said multi-channel network interface card is an InfiniBand card.

15. A method for filtered application-to-application communication of applications running on computing platforms including an operating system kernel, said method comprising:
multi-channel communication hardware; and
at least one application interface and filter operative to provide filtered data from an application process directly to said multi-channel communication hardware by bypassing a portion of the operating system kernel associated with communication resources.

16. The system of claim 15, wherein said communication hardware is a multi-channel network interface card having direct user-to-hardware access.

17. The system of claim 16, wherein said multi-channel network interface card is an InfiniBand card.

18. A method for filtered application-to-application communication of applications running on computing platforms including an operating system kernel, said method comprising:
multi-channel communication hardware;
at least one application interface and filter operative to provide filtered data from an application process directly to said multi-channel communication hardware by bypassing a portion of the operating system kernel associated with communication resources; and
at least one an authentication service adapted to determine whether said application process is genuine and/or whether at least one machine participating in said application process is genuine.

19. The system of claim 18, wherein said communication hardware is a multi-channel network interface card having a direct user-to-hardware access.

20. The system of claim 19, wherein said multi-channel network interface card is an InfiniBand card.

* * * * *